Oct. 27, 1970   R. F. ROMANOWSKI   3,535,878
BELLOWS CONTROLLED SUDDEN PRESSURE RISE RELAY
Filed June 2, 1969   2 Sheets-Sheet 2

INVENTOR
ROBERT F. ROMANOWSKI
BY
Stephen J. Rudy
ATTORNEY

United States Patent Office 3,535,878
Patented Oct. 27, 1970

3,535,878
BELLOWS CONTROLLED SUDDEN PRESSURE
RISE RELAY
Robert F. Romanowski, Rochester, N.Y., assignor to
Qualitrol Corporation, Fairport, N.Y., a corporation of
New York
Filed June 2, 1969, Ser. No. 829,464
Int. Cl. F15b 7/00; H01h 37/36; G05d 23/12
U.S. Cl. 60—54.5                                14 Claims

ABSTRACT OF THE DISCLOSURE

A relay unit designed for association with a fluid cooled transformer apparatus. The relay acts by means of a hydraulic bellows system to sense internal pressure variations in a tank member of the transformer apparatus; and it responds to a sudden rise in the pressure to actuate an alarm switch. The system includes a bellows which senses the pressure variation, and responds by forcing liquid in the system through a common chamber and connecting passages to each of a pair of pressure responsive bellows. The passage to one of the pair of bellows is relatively restricted as compared to that to the other, so that when a sudden pressure rise develops the system liquid flows in greater volume to one of the bellows than to the other. This causes differential expansion of the pair of bellows and consequent upsetting of linkage controlling operation of the switch. An orifice flow control unit removably inserted in the common chamber includes a thermostatic blade overlying the restricted passage. The blade responds to temperature changes in the bellows system liquid so as to move closer to or further clear of the restricted passage. In this manner, it serves to regulate and to maintain a constant rate of flow of the system liquid through the restricted passage over an operating range of −40 to 100° C. Should the bellows fluid accidentally leak away, one of the bellows will respond to this situation by upsetting the linkage to cause actuation of the alarm switch. A fitting is provided in the housing of the relay through which pressure air may be applied to the bellows system independently of the associated transformer apparatus in order to test the operation of the relay.

BACKGROUND OF THE INVENTION

This invention is concerned with a fluid bellows system controlled relay unit designed to operate an alarm switch in response to a sudden rise in the internal pressure of a tank apparatus with which the relay is associated.

The relay is especially suited for use as a protective device for a fluid cooled transformer apparatus.

The relay includes a group of three bellows connected with one another through a common chamber in a closed fluid filled hydraulic system. When pressure is applied to a first one of the bellows, herein characterized as a pressure sensing bellows, the other two are caused to expand as a consequence of the fluid being forced through the system. Because of a relatively restricted connection with the system, one of the two bellows will expand relatively faster than the other when a sudden pressure increase is applied to the sensing bellows. This relative expansion will cause an alarm switch to be operated. The relay is intended for operation in a range of −40 to 100° C. The viscosity of the bellows fluid is high at cold temperature and low at hot temperature. To obtain a proper relay response over this wide temperature range, it is essential that the flow rate of the bellows fluid through the restricted passage to the related bellows be substantially constant.

The general object of the invention is to provide an automatic control which will be responsive to ambient temperature to enlarge the passage of fluid through the restricted passage in the bellows system when the fluid viscosity is high, and to restrict the passage of fluid when the fluid viscosity is low.

This is accomplished by means of a flow control unit removably insertable in the bellows system which includes a thermostatic blade associated with a restricted orifice of a predetermined size. The blade responds to hot temperature to restrict the passage of fluid through the orifice; and responds to cold temperature to increase the passage of fluid through the orifice.

Another safety feature lies in an adapter fitted to the housing of the relay which permits selective application of pressure to the bellows system to test the operation of the relay.

It is a further object of the invention to operatively associate the bellows system with the alarm switch in such manner that should the fluid in the system drain off because of a leak, the bellows system will respond to actuate the alarm switch.

DESCRIPTION OF PREFERRED EMBODIMENT

Figure 1:
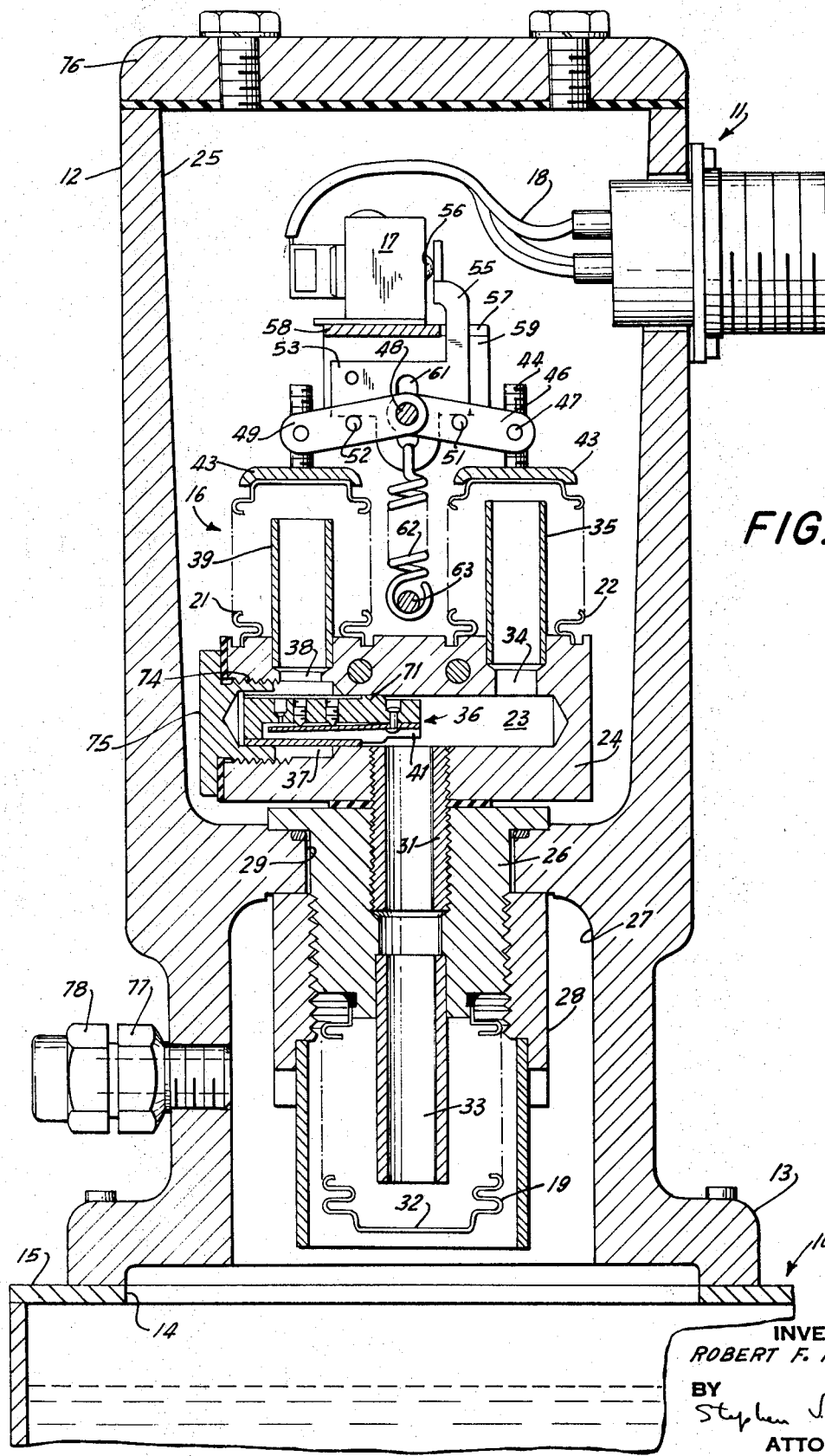
FIG. 1 is a vertical section of a relay unit embodying the invention, a fragmentary portion of a fluid cooled electrical transformer apparatus to which the relay has been applied is also shown.

Reference is now directed to the drawing wherein is shown a conventional fluid cooled electrical transformer apparatus 10 to which a protective relay unit 11 has been applied.

The relay 11 includes an upright housing 12 having a mounting flange 13 mounted over an opening 14 in the top wall of a tank member 15 of the transformer apparatus. The tank is sealed and contains the usual cooling fluid in which the usual electrical transformer (not shown) is immersed. The relay includes a closed hydraulic bellows circuit system 16 which responds to a sudden rise developing in the internal pressure of the tank to operate an alarm switch 17 in an electrical control circuit 18. The system also responds to normal pressure changes in he tank but without actuating the switch.

The system 16 includes a group of three bellows 19, 21 and 22, of which bellows 19 serves to sense pressure changes in the tank; and the other two respond to the pressure sensed in controlling operation of the switch. The interiors of the three bellows are connected with one another through a common chamber 23 formed in a supporting block 24. The block is located in an upper compartment 25 of the housing, which compartment is sealed by means of a plug bushing 26 from a recess 27. The latter opens through the bottom of the housing. The bushing is retained by means of a collar nut 28 in an opening provided by an annular internal shoulder 29 of the housing. The block 24 is threadedly coupled to the head end of the bushing by means of pipe nipple 31.

The three bellows are of an axially expanding type. The sensing bellows 19 is located in the recess 27. It is sealed at its upper end to the bushing 26; its bottom end 32 is exposed through the recess to the interior of the associated tank 15. The interior of the sensing bellows connects by means of a passage 33 through the pipe nipple with the common chamber 23. The pressure responsive bellows 21 and 22 are mounted at their bottom ends to the top surface of block 24 and extend upwardly in parallel spaced relation to each other. The common chamber 23 connects through a port 34 and a bellows contraction stop tube 35 with the interior of bellows 22. It also connects through a flow control unit 36 (FIGS. 1, 3–7) with an annulus 37. The latter connects through a port 38 and a bellows contraction stop tube 39 with the interior of bellows 21. The passage through the control unit is defined by an elongated channel 41 and a connecting orifice 42. The orifice is restricted relative to the port 34 associated with bellows 22.

Figure 2:
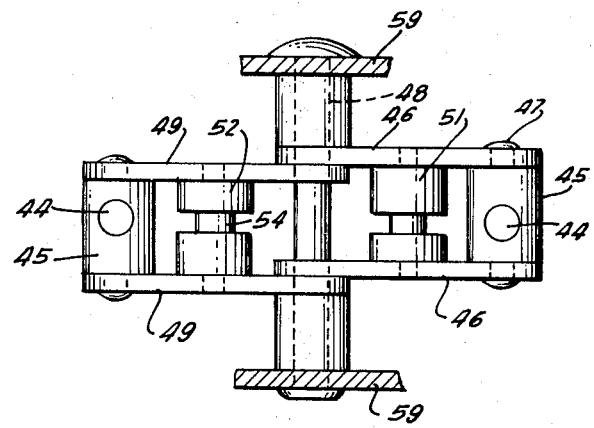
FIG. 2 is a detail in top plan of the bellows linkage.

Each of the bellows 21 and 22 has a top end plate 43 from which extends an upright threaded post 44 (FIGS. 1, 2) carrying a spacer nut 45. A pair of parallel links 46 spaced by one of the nuts is pivoted at one end upon a pair of pins 47 projecting from opposite faces of the nut; the opposite ends of the links are pivoted upon a stationary rod 48. A second similar pair of links 49 is similarly pivoted at opposite ends respectively upon its related nut and upon the rod 48. A spacer pin 51 is supported between links 46; and a similar spacer pin 52 is supported between links 49.

The bellows system 16 is filled with an oil conventional to bellows of this nature. The oil is of a type having a flat viscosity curve such as is characteristic of silicone oils. The oil is slightly pressurized in the system so that the three bellows have a normal condition, as in FIG. 1, in which the free ends of the bellows are clear of their respective stop tubes. In this normal condition, the spacer pins 51 and 52 are at the same level and support a switch plate 53. The latter rests upon grooved neck portions 54 of both spacer pins in a condition of balance or equilibrium. In this respect, an under shoulder at each end of the switch plate rests upon a separate one of the spacer pins. An arm 55 of the plate overlies a depressible switch pin 56. The arm operates in a guide slot 57 formed in a supporting plate 58. The latter bridges a pair of upright side plates 59 (FIG. 2), mounted to opposite sides of block 24. The switch plate 53 has a pivoted relation to the rod 48 by means of a vertical slot 61 through which the rod passes. A spring 62, hooked in a depending end of the slot below the rod 48, and anchored upon a second rod 63, biases the switch plate 53 downward to seated condition upon the spacer pins 51 and 52. The rods 48 and 63 are supported at their ends in the side plates 59.

It is apparent that a progressive slow contraction of the sensing bellows 19, as a consequence of gradually increasing presure applied to it by normal presure changes developing within the tank 15, will force the oil in the bellows system slowly and evenly through the interconnecting passages into bellows 21 and 22. These latter will accordingly progressively expand axially in equal degree so that their related spacer pins 51 and 52 will act equally upon the switch plate 53 and cause its arm 55 to slide ineffectively over the switch pin 56.

It is also apparent that a sudden contraction of the sensing bellows 19, as a consequence of a sudden rise in the internal pressure of the tank, will force the oil in the bellows system to flow in greater volume through port 35 into belows 22 than through the restricted flow control unit into bellows 21. As a consequence, bellows 22 will expand axially relative to bellows 21 and will force by means of its related spacer pin 51 the switch plate counterclockwise so as to actuate the switch pin 56.

The relay 11 is designed to operate in a temperature range of —40 to 100° C. In this range, the viscosity of the bellows oil will be high at cold temperature and low at hot temperature. To obtain a proper operating response of the relay throughout this range, the rate of flow of the oil in the belows system through the restricted orifice 42 to the bellows 23 should be substantially constant. The objective of the flow control unit 37 is to maintain this substantially constant rate of flow throughout the temperature range. To this end, the flow control unit 36 (FIGS. 1, 3–7) includes a bi-metal thermostatic blade 64 located in the channel 41. The blade cooperates in the manner of a gate relative to the inner end of the orifice 42 to permit increased or decreased flow from the common chamber 23 to bellows 21 as needed to compensate for changes in the viscosity of the oil in the system.

Figure 7:
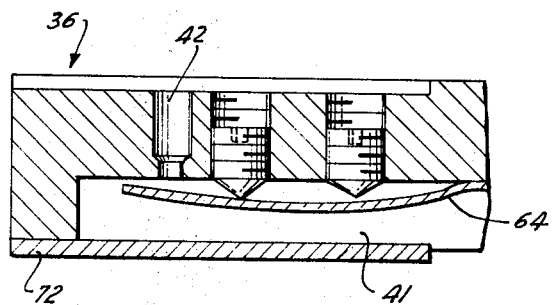
FIG. 7 is a view simliar to FIG. 6 but showing the flexed condition of the blade under an ambient hot temperature condition.

The control unit represents a decided advantageous feature of the relay. tI is a separable unit adapted to be removably inserted in one end of the common chamber 23. The control unit includes a cylindrical core 65 in which the channel 41 is formed. The channel is of square cross section and opens through the forward end of the core. The opposite end is closed by the rear end of the core. The blade 64 is riveted at one end 67 to the bottom of channel 41 so that its opposite free end overlies the inner end of the orifice 42. The latter opens radially through the core. A pair of parallel spaced set screws 68 and 69 in the core project radially into the channel intermediately of the ends of the blade. Screw 68 is adjustably set into engagement with the blade so as to space the free end of the blade at a predetermined normal clearance from the orifice 42, as in FIG. 5. The adjustment is made in accordance with a given viscosity of the bellows oil at ambient room temperature, substantially at 25° C. The second screw 69 is adjusted so as to project slightly into the channel 41 with a predetermined normal clearance from the blade, as in FIG. 5. Its function is to prevent the blade, as indicated in FIG. 7, during hot temperature from deflecting to a closed condition over the orifice, and to keep the blade sufficiently clear of the orifice so as to maintain a proper flow of bellows oil through the orifice.

Figure 3:
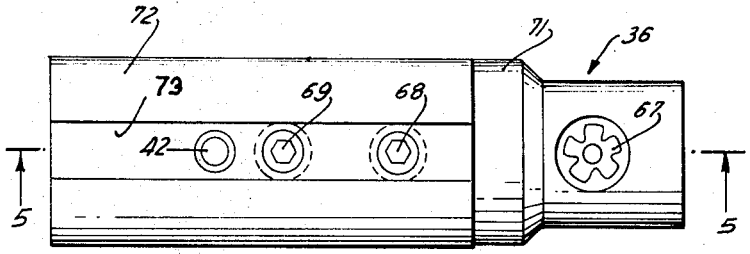
FIG. 3 is an enlarged detail in plan of the control unit.
Figure 4:
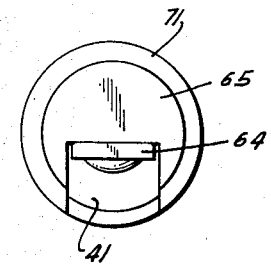
FIG. 4 is a right end view of FIG. 3.
Figure 5:
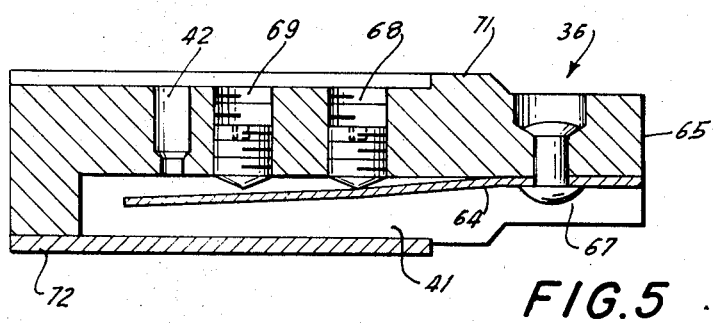
FIG. 5 is a section taken on line 5—5 of FIG. 3.

An annular land 71 of the core separates a short forward portion from an elongated rear portion of the core. A split spring sleeve 72 encases the rear portion of the core so as to cover over a corresponding longitudinal open area of the channel 41. The split ends of the sleeve define a slot 73 which is wide enough to expose the exit end of the orifice 42 and the heads of the set screws 68 and 69, as best seen in FIG. 3.

The control unit 36 is insertable through an opening 74 of block 24 so as to enter the land portion 71 of the core and an adjacent part of the split sleeve 72 into the common chamber 23. In entering the control unit, the spring sleeve is squeezed to contract it slightly so as to allow it to obtain a spring tight fit in the common chamber. The block opening 74 is sealed by means of a removable screw plug 75.

Figure 6:
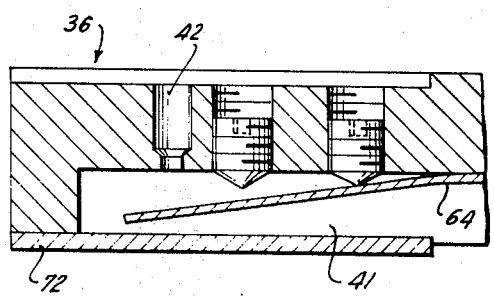
FIG. 6 is a fragmentary section illustrating the deflection of the blade relative to the orifice under an ambient cold temperature condition.

By means of this arrangement, when due to low temperature the viscosity of the bellows oil is high, the blade 64 will deflect, as in FIG. 6, away from the orifice 42 in the manner of a gate so as to allow easier and greater flow of the oil from the channel 41 through the orifice 42. At hot temperature when the oil viscosity is low, the blade will flex closer to the orifice so as to restrict the flow through the orifice, as in FIG. 7.

It can be seen that if an adjustment is required in the blade clearance relative to the orifice 42, the control unit 36 may be removed for that purpose through the block opening 74. To do this, a cover plate 76 is first removed from the housing 12; and the block 24 together with its super structure is lifted out of the housing after the block has been unscrewed from the pipe nipple 31. The screw plug 75 may then be removed to allow the control unit 36 to be pulled out of the block. The set screws 68 and 69 may then be adjusted through the sleeve slot 73 to obtain any needed adjustment in the blade clearance.

Another advantage of the relay unit is provided by the relative height of the bellows contraction stop tubes 35 and 39. If a leak should develop in the bellows system so as to cause the bellows oil to drain off, both bellows 21 and 22 will progressively contract under the load of the linkage 46, 49 and the bias of the spring 62. The contraction of bellows 21 will continue beyond that of bellows 22 because of its shorter stop tube 39. As a result, the switch plate 53 will be pivoted by the spring 62 counterclockwise about the rod 48 to actuate the alarm switch 17.

A means for testing the working operation of the relay unit is provided by an adapter 77. The latter is threadedly engaged in a bore of the housing so that a passage through the adapter communicates with the recess 27 containing the sensing bellows 19. The adapter is normally closed by a cap 78. To test the operation of the relay, the cap is removed and pressure air is fed through the adapter into the recess 27 while the relay is mounted upon the tank 15 of the transformer unit. A sudden increase in the pressure built up in the recess should cause the relay to operate the alarm switch if the relay is in working condition; and a progressive slow rise in the pressure should not cause operation of the switch.

What is claimed is:

1. In a sudden pressure rise relay including a group of fluid filled bellows interconnected with one another in a closed hydraulic system through a common chamber, control means responsive to temperature variations in the hydraulic system to regulate fluid flow through a passage connecting the common chamber with a selected one of the bellows of the group.

2. In a sudden pressure rise relay as in claim 1, wherein the control means includes a body member having a radial orifice communicating with the interior of the selected bellows, and having an elongated channel communicating an inner end of the orifice with the chamber, the orifice and channel defining said passage, and a temperature responsive bi-metal blade fixed at one end in the channel having a free end underlying the inner end of the orifice.

3. In a sudden pressure rise relay as in claim 2, wherein a set screw is provided in the body member which is adjustably engageable with the blade intermediately of the ends of the blade for tensioning the free end of the blade to a predetermined normal distance clear of the inner end of the orifice.

4. In a sudden pressure rise relay as in claim 3, wherein a second adjustable set screw is provided to limit the extent of thermostatic movement of the blade toward the inner end of the orifice.

5. In a sudden pressure rise relay as in claim 1, wherein the control means is a unit comprising: a body plugged in one end of the chamber and having an elongated channel connecting the chamber with an orifice communicating with the interior of the selected bellows, a temperature responsive bi-metal blade located in the channel having a free end underlying in close predetermined spaced relation an inner end of the orifice, the blade being responsive to hot temperature to move closer to the said end of the orifice, and being responsive to cold temperature to move further away from said end of the orifice.

6. In a sudden pressure rise relay including a group of bellows interconnected with one another in a closed hydraulic system in which a chamber is common to the group, an orifice control unit connecting the chamber with a selected one of the bellows, the control unit comprising a body member having a radial orifice communicating with the interior of the selected one of the bellows and having an elongated channel communicating the chamber with an inner end of the orifice, and a temperature responsive bi-metal blade fixed at one end in the channel having an opposite free end underlying with a predetermined clearance the said inner end of the orifice, the blade being responsive to ambient hot temperature to move closer to said end of the orifice and being responsive to ambient cold temperature to move further clear of the said end of the orifice.

7. In a sudden pressure rise relay as in claim 6, wherein the chamber is formed in a block having at one end an opening to the outside, the control unit is removably insertable through the opening in plugged relation to the chamber, and removable closure means is provided for closing the opening.

8. In a sudden pressure rise relay as in claim 6, wherein set screw means provided in the body member is selectively adjustable relative to the blade for adjusting the clearance of the blade relative to the end of the orifice.

9. In a sudden pressure rise relay as in claim 6, wherein the group includes a pair of bellows which normally support a spring tensioned pivoted switch actuating plate in equilibrium, and one of the bellows of the pair is responsive to a sudden rise in pressure of fluid in the hydraulic system to upset the said equilibrium so as to cause the plate under the tension of its spring to pivot so as to actuate an alarm switch.

10. In a sudden pressure rise relay as in claim 9, wherein the selected bellows is one of the pair and has a bellows contraction stop tube which permits relatively greater retraction of the said selected bellows than a bellows contraction stop tube arranged in the other bellows of the pair, and the said selected bellows is responsive to a greater degree of contraction relative to the other bellows of the pair to upset the said equilibrium of the plate so as to cause the plate to actuate the alarm switch.

11. In a sudden pressure rise relay as in claim 9, wherein pivotable linkage carried by the bellows normally supports the plate in equilibrium.

12. In an electrical transformer apparatus including a tank having an opening in its top wall and containing cooling fluid in which a transformer is immersed, a sudden pressure rise relay unit having a housing with a recess mounted over the opening, a group of fluid filled bellows in the housing interconnected with one another in a closed hydraulic system through a common chamber in which group a first one of the bellows is exposed through the recess to internal pressures that might develop within the tank, a second one of the group having an orifice connection with the common chamber and the third one of the group having a relatively wider port connection with the common chamber, fluid in the system being responsive to sudden pressurization of the first bellows to flow faster into the third bellows than into the second bellows so as to cause the third bellows to expand at a faster rate than the second bellows, linkage responsive to differential expansion of the second and third bellows to actuate a signal switch, the viscosity of the fluid in the system being subject to change with variations in the ambient temperature, and a thermostatic control means mounted in the housing responsive to ambient temperature variations to maintain the rate of flow of the fluid in the system through the orifice at a substantially uniform rate.

13. In an electrical transformer apparatus as in claim 12, wherein the thermostatic control means is a separable unit removably mounted in the housing having a core in which the orifice is formed, an elongated channel in the core connecting the orifice with the common chamber, and a thermostatic blade fixed in the channel having a free end overlying an entrance end of the orifice with a predetermined normal clearance.

14. In an electrical transformer apparatus as in claim 12, wherein a fitting mounted in the housing is adapted for selectively connecting the recess with a source of pressure air for purposes of testing the operation of the relay unit.

References Cited

UNITED STATES PATENTS

| | | | |
|---|---|---|---|
| 1,047,264 | 12/1912 | McNeil | 337—307 |
| 1,881,266 | 10/1932 | Degiers | 60—54.5 XR |
| 1,994,983 | 3/1935 | Deflorez et al. | 236—99 |
| 2,064,946 | 12/1936 | Reynolds | 337—307 |
| 2,213,505 | 9/1940 | Raney | 337—308 XR |
| 2,505,981 | 5/1950 | McLeod | 236—82 |

MARTIN P. SCHWADRON, Primary Examiner

R. R. BUNEVICH, Assistant Examiner

U.S. Cl. X.R.

60—62.6; 337—308; 236—99